3,179,220
CLUTCH ACTUATING MECHANISM
William H. Sink, Toledo, Ohio, assignor to Dana Corporation, Toledo, Ohio, a corporation of Virginia
Filed Apr. 6, 1962, Ser. No. 185,545
10 Claims. (Cl. 192—48)

This invention relates to axially engageable dual friction clutches in general and is particularly directed to a dual clutch having an actuating mechanism which incorporates means whereby either clutch can be selectively connected to a common driving member by a single operating means.

In some types of power transmitting installations it is desirable to connect either one or the other of two rotary members to a third member. The use of dual clutches is very adaptable to these types of installations and has many advantages over the use of separate clutches. However, the operating mechanisms of prior art designs leave much to be desired. Some of the prior art designs have separate actuating and throw-out mechanisms for each clutch thereby requiring a complicated linkage system, while other designs utilize the same actuating and throw-out mechanisms for each clutch. Those prior art designs utilizing the common lever and throw-out mechanism are usually of the "push type" and require a toggle type lever for moving a pressure plate in either axial direction to engage either one or the other clutch. The "lash" due to manufacturing tolerances and to wear in the mechanism brings about a serious disadvantage in that it reduces the clutch applying force (that is, it subtracts from the axial movement, in both axial directions, of the pressure plate).

Therefore, a primary object of this invention is to provide an improved actuating mechanism wherein the manufacturing and wear tolerances do not substantially subtract from the clutch applying force.

Another object of this invention is to achieve independent control of two clutches located in a single housing by means of a common throw-out member.

A further object of this invention is to provide a clutch structure which materially reduces the longitudinal length of the clutch housing by utilizing common biasing springs.

A still further object of this invention is to provide an improved clutch actuating mechanism wherein the load on the throw-out member is relieved when either clutch is engaged.

Yet another object of this invention is to provide the actuating means with a locking mechanism which will lock either one or the other of the pressure plates in a disengaged position so that the opposite clutch can be engaged.

Further objects and advantages will become apparent upon reading the following specification, together with the accompanying drawings which form a part hereof.

Figure 1:
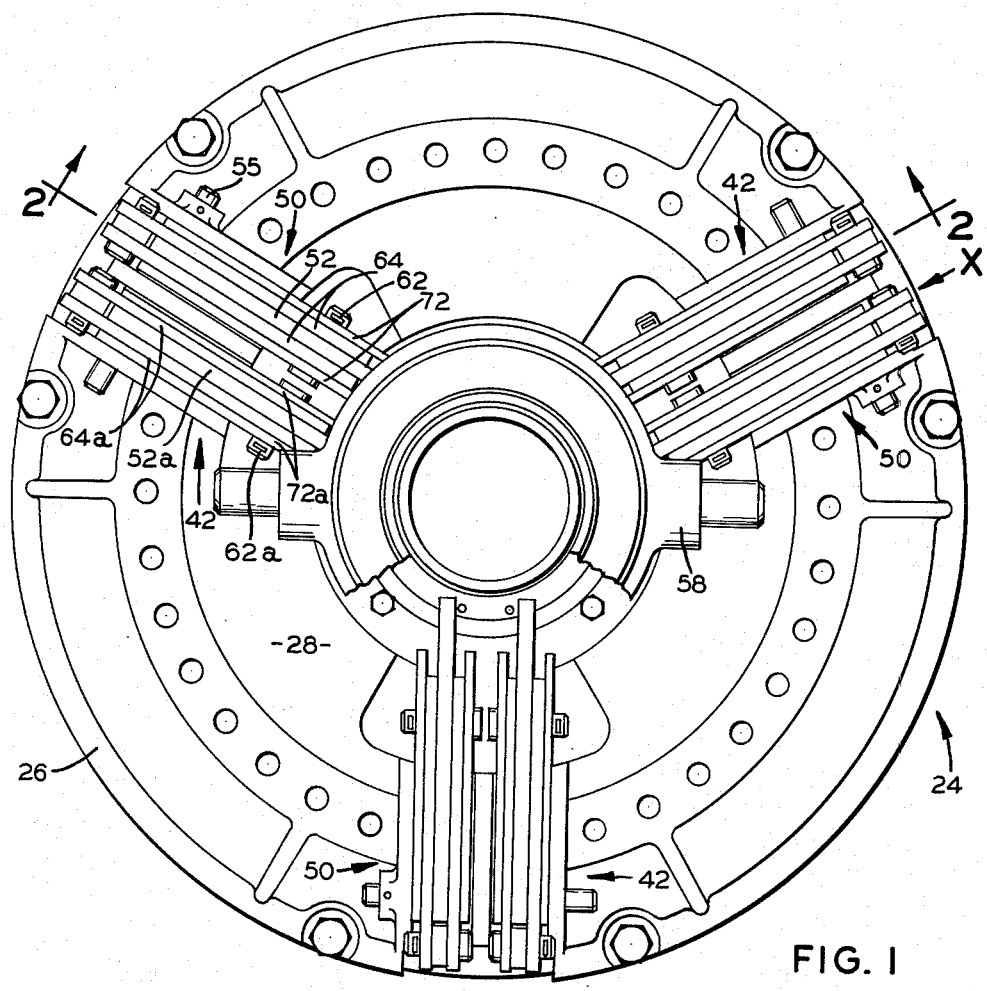
Figure 3:
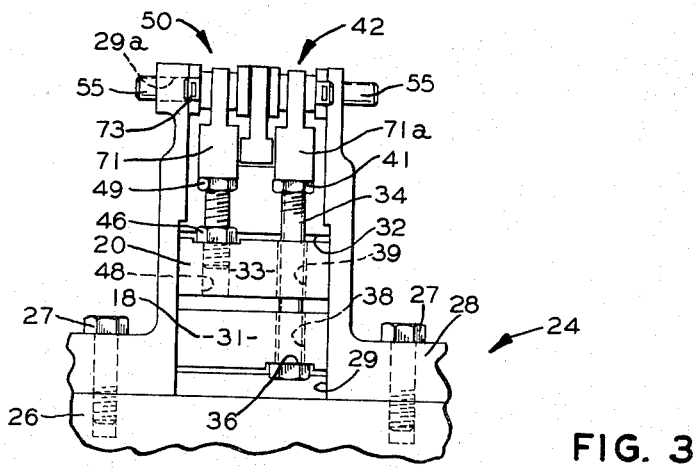
Figure 2:
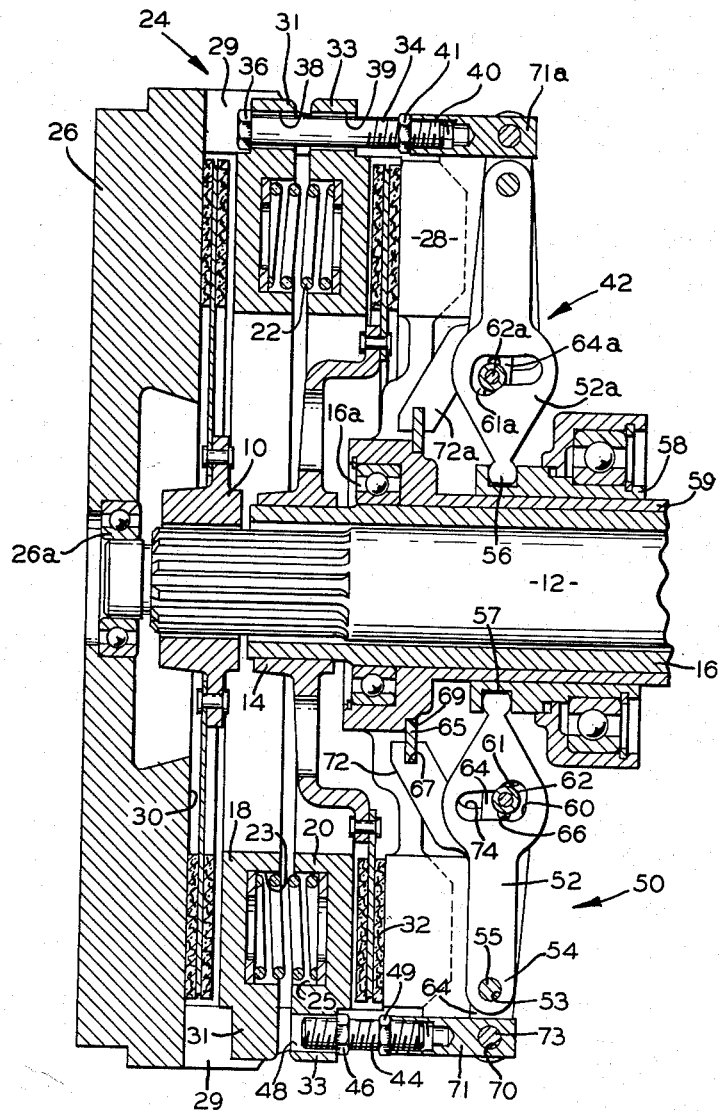
Figure 4:
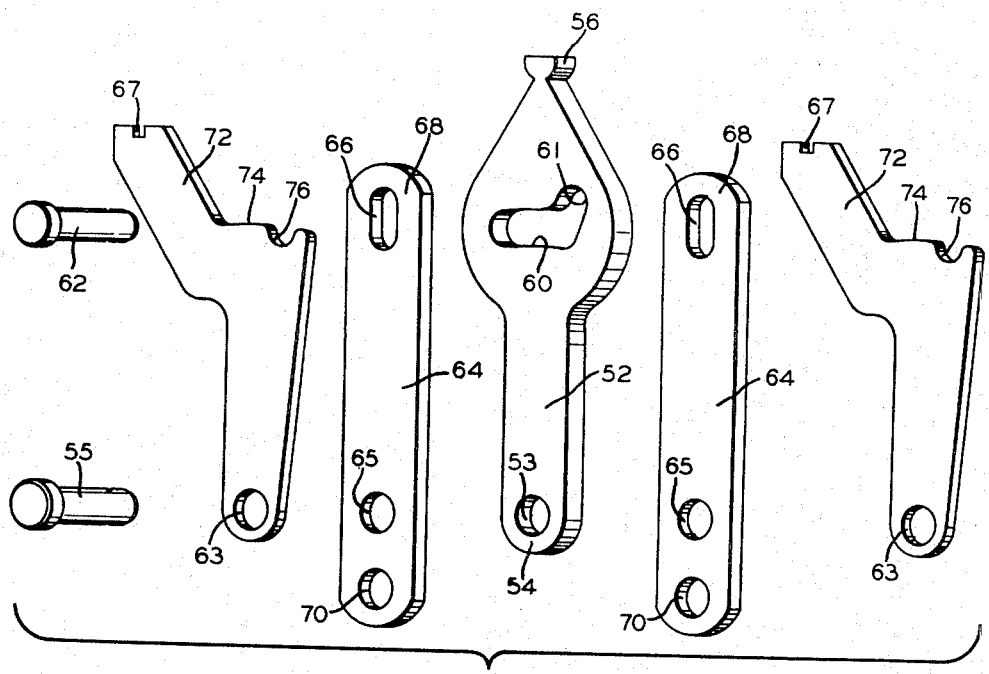
Figure 5:
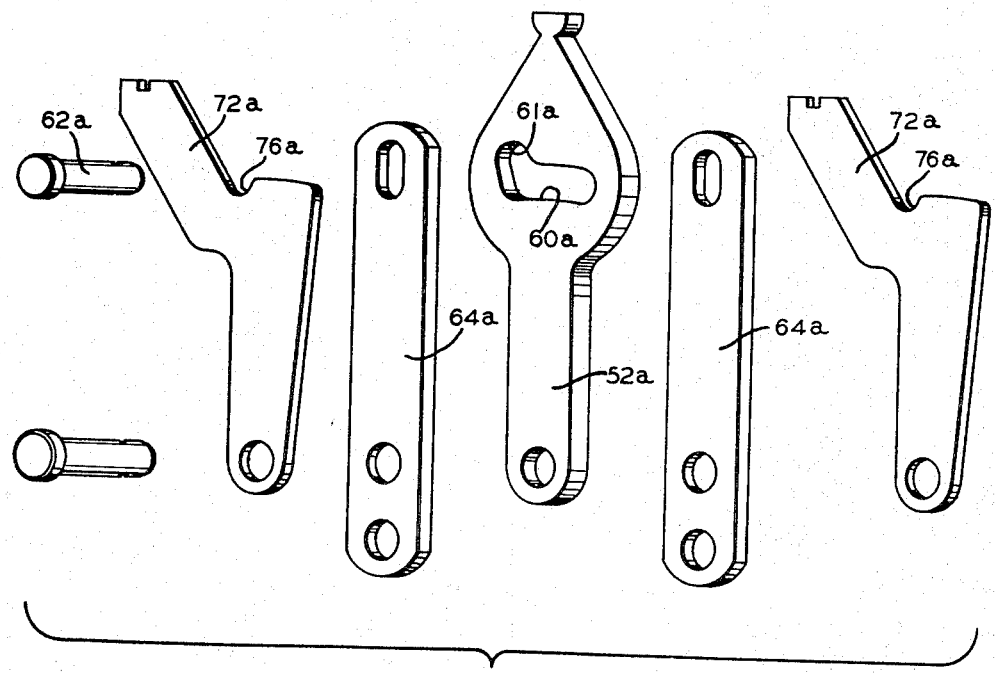

In the drawings:
FIG. 1 is a rear view of a dual clutch showing the arrangement of the actuating members embodied in this invention;
FIG. 2 is a sectional view taken substantially along line 2—2 of FIG. 1 showing the actuating mechanisms in their neutral or mid-position;
FIG. 3 is a partial elevation view of the actuating mechanism looking in the direction of arrow X in FIG. 1;
FIG. 4 is an exploded perspective view of a portion of the actuating mechanisms for engaging one of the clutches showing the relationship of the component parts, and
FIG. 5 is a view according to FIG. 4 of the actuating mechanism for the other clutch.

The present invention relates primarily to improvements in the actuating mechanisms for dual clutches, although some features of this invention may be advantageously used in other type clutches. Generally, the invention comprises a dual clutch structure wherein a pair of clutches are positioned in a back-to-back relationship for utilization of common biasing or spring loading means between the separate pressure plates of the two clutches. Two sets of actuating levers are provided, one set is operatively connected to one pressure plate and the other set is operatively connected to the other pressure plate. The structure of the actuating levers and their relationship to the pressure plates are such that they may have an intermediate position wherein the pressure plates are both disengaged in opposition to common loading springs. By selecting the proper linkage to the actuating levers, this intermediate position can be utilized as neutral or merely a cross-over point from one clutch to the other. When the actuating mechanism is operated so that one of the pressure plates is released, it is biased into it clutch engaging position by the spring loading means.

Referring more particularly to the drawings (wherein the directions "left" and "right" are used in respect to FIG. 2) a first driven member 10 is splined for axial movement to the forward portion of a transmission input shaft 12 while a second driven member 14, axially aligned with the first driven member, is splined for axial movement to the forward portion of a quill shaft 16 concentrically arranged about the input shaft 12. A pair of axially movable pressure elements or plates 18 and 20 are sandwiched between the driven members 10 and 14 in back-to-back relationship. The pressure plates 18 and 20 are movable relative to each other and to the driven members 10 and 14 and have a plurality of preloaded spring means 22 caged therebetween. The spring means 22 are received in pockets 23 and 25 respectively for biasing the pressure plates in opposite axial directions; the pressure plate 18 being urged toward driven member 10 and the pressure plate 20 being urged toward the driven member 14 and adapted to drivingly engage the same.

A rotary clutch housing indicated generally by the reference numeral 24 constitutes the driving member and includes an engine driven flywheel 26 and an integral cover and back plate 28. The cover 28 is drivingly connected to the flywheel 26 by a plurality of bolts 27 interconnecting the same. The flywheel 26 rotatably mounts the outer end of the input shaft 12 in a bearing 26a fixedly secured in a central aperture in the flywheel 26. The right face of the flywheel 26 provides an annular radial friction surface 30 which constitutes the front driving member for cooperating with the driven member 10 and the pressure plate 18. The back plate 28 is provided with an internal annular friction face 32 spaced from and parallel to the surface 30, which friction face 32 cooperates with the driven member 14 and the pressure plate 20. The quill shaft 16 is rotatably mounted in a bearing 16a fixedly secured in a central aperture in the back plate 28.

The pressure plates 18 and 20 are drivingly connected to the back plate 28. More particularly the back plate 28 is provided with three circumferentially spaced, radially and axially extending slots 29 which each receive registering drive lugs 31 and 33 provided on the plates 18 and 20 respectively. The drive lugs 31 and 33 are in circumferential abutment with the slots 29 while being axially slidable therein relative to the back plate 28.

Means is provided for axially fixing or releasing the pressure plates 18 and 20. More specifically, each drive lug 31 and 33 of the pressure plates 18 and 20 have aligned axially extending openings 38 and 39 respectively. A pull rod 34 in the form of an elongated screw is slidably received in the aligned openings 38 and 39 and is provided with a head or shoulder 36 at the left end which shoulder is adapted to abuttingly engage the left face of the lug 31 on the pressure plate 18 so that upon movement of the pull rod 34 to the position shown in FIG. 2, the shoulder 36 will abuttingly engage the lug 31 and prevent the pressure plate 18 from moving to the left. Upon movement of the rod 34 to the left, the pressure plate 18 will be free to be biased by the spring means 22 due to the lost motion connection now present between the plate 18 and the rod 34. The other end of the pull rods 34 are threadedly attached in an adjustable manner, as shown at 40, to an actuating mechanism indicated generally by the reference numeral 42. A locking nut 41 is threadedly positioned on the rod 34 and adapted to abuttingly engage the actuating mechanism 42 for securing the adjustment of the relative length of the pull rod 34 in a well known manner.

Each drive lug 33 of the pressure plate 20 has an axially extending opening 48 therein which is circumferentially spaced from the opening 39. A push rod 44 is slidably received in each opening 48 and provided with a shoulder in the form of nut 46 threadedly positioned thereon intermediate its ends. The shoulder 46 is adapted to abuttingly engage the right face of the lugs 33 so that upon movement of the push rod 44 to the position shown in FIG. 2, the shoulder 46 will abuttingly engage the lug 33 and prevent the pressure plate 20 from moving to the right. Upon movement of the rod 44 to the right, the shoulder 46 will be removed from the lug 33 thereby allowing the plate 20 to be biased to the right by the spring means 22 as a result of the lost motion connection between the rod 44 and the plate 20. The other end of the rod 44 is threadedly attached to an actuating mechanism indicated generally at 50. A locking nut 49 is threadedly positioned on each push rod 44 and adapted to abuttingly engage the actuating mechanism 50 for securing the adjustment of the push rod thereto.

Referring to FIGS. 1, 2 and 4 the actuating mechanism 50 comprises an actuating lever 52 having its radially outer end 54 pivotally mounted on the back plate 28 as by a pivot pin 55 passing through an opening 53 therein and fixedly secured in a cooperating opening 29a in the plate 28. The other end 56 of the lever is received in an annular slot 57 in an annular throw-out collar 58 and is adapted to be moved in either axial direction thereby. The throw-out collar 58 is mounted for axial movement on a sleeve 59 integral with and extending axially from the cover 28. The lever 52 is further provided with an "L-shaped" aperture 60 intermediate its ends for receiving cylindrical cam follower 62.

A pair of transfer levers 64 are positioned one adjacent to each side of the actuating lever 52 and are pivotally mounted on the back plate 28 by means of the pivot pin 55 passing through an opening 65 provided in the transfer levers. The transfer levers 64 are further provided with a radially extending slot 66 at their inward ends 68 for receiving the cylindrical cam follower 62. The radially outer ends of the transfer levers 64 pivotally mount a linkage rod 71 by means of a pivot pin 73 passing through aligned openings 70 therein. The linkage rod 71 threadedly receives the push rod 44 as previously described.

A pair of stationary cam plates 72 are positioned one on each outward side of the transfer levers 64 and are suitably fixedly secured to the back plate 28 as by the pin 55 passing through the opening 63 therein and by a snap ring 65 positioned in registering openings 67 and 69 in cam plates 72 and back plate 28 respectively. The cam plates 72 are provided with an axially extending cam surface 74 having an indented portion 76 which cooperates with the cylindrical cam follower 62. As shown in FIGS. 2 and 4, the indented portion 76 is positioned toward the right side of surface 74 and is adapted to coincide with the radially extending leg 61 of the "L-shaped" aperture 60 of the lever 52. If desired, the cam plates 72 may be formed integrally with the back plate 28 instead of merely fixedly attached, however, the latter method facilitates manufacturing.

The cylindrical cam follower 62 has portions which cooperate with the cam surface 74 and 76 of the cam plate 72, the aperture 66 of the transfer lever 64, and the "L-shaped" aperture 60 of the lever 52. When the actuating mechanism 50 is in its intermediate position, as shown in FIG. 2, the lever 52 can be moved in either axial direction.

When the throw-out collar 58 is moved toward the flywheel 26, the lever 52 is pivoted to the left thereby (counterclockwise) and the right side of aperture 60 engages the cam follower 62 and carries the same therewith. The cam follower 62 positioned in the slot 66 of transfer lever 64 causes the lever 64 to move in a counterclockwise direction. During this movement the cam surface 74 and 76 of the cam plate 72 urges the cam follower 62 radially into the leg portion 61 of the aperture 60. This radial movement is accommodated by the radially elongated slot 66 in lever 64. Thus, the transfer levers 64 now pivot in a counter-clockwise direction with the lever 52 and in so doing retract the shoulder 46 on push rod 44 from the pressure plate 20 so that springs 22 can bias the pressure plate into engagement with the driven member 14.

When the throw-out collar 58 is moved away from the flywheel 26 the lever 52 is pivoted to the right (clockwise) and the leg portion 61 of the aperture 60 carries the cam follower 62 therewith, which cam follower urges clockwise rotation of the lever 64 which clockwise movement moves the push rod 44 to the left pushing the plates 20 therewith. Upon movement to the right past the intermediate position shown in FIG. 2, the leg 61 of aperture 60, acting as a cam, urges the cam follower 62 into the indented portion 76 of the cam plate 72; the aperture 60 then locks the cam follower 62 to the cam plate. The lever 52 continues to pivot relative to the transfer member 66 which is now secure to the cam plate 72 by the cam follower 62. The follower freely moves in the aperture 60 as the lever 52 pivots. Since the transfer member 66 is secured to the cam plate 72, the pressure plate 20 which is connected thereto by rods 44 and 71 is also fixedly positioned and held from moving to the right to engage its cooperating driven member 14.

As shown in FIG. 5, the actuating mechanism 42 differs from the actuating mechanism 50 by the reversed positioning of the "L-shaped" aperture 60 in the actuating lever 52a, the indented portion 76a in the cam plates 72a and thus, when the actuating mechanism 50 is in one position, the actuating mechanism 42 will be in the the exact opposite position and vice versa.

As previously described, the pressure plates 18 and 20 are normally urged apart in opposite axial directions by the biasing springs 22. With the actuating mechanisms positioned in their intermediate position as shown in FIG. 2, both the pressure plates 18 and 20 are held out of engagement with their driven members 10 and 14 respectively. When the throw-out collar 58 is moved towards the flywheel 26, the transfer members 64 of the actuating mechanisms 50 pull the push rods 44 away from the pressure plate 20 thereby permitting the biasing springs 22 to move the pressure plate 20 into engagement with the driven member 14. At the same time, the levers 52a of the actuating mechanism 42 move relative to the transfer levers 64a which are locked to the cam plate 72a by cam followers 62a and maintain the linkage rods 71a and the pressure plate 18 stationary to act as the reaction point for the springs 22. When the throw-out collar 58 is moved in an axial direction away from the flywheel 26, the actuating mechanisms 50 and 42 will be moved to a position reversed from that described above whereby the pressure plate 20 will be held stationary to act as the reaction means for the springs 22 and the pressure plate 18 will be permitted to be biased into engagement with the driven member 10. In either of the clutch engaged positions, the reaction of the springs 22 is against a locked pressure plate 18 or 20, and the linkages 42 and 50 do not load the throw-out collar 58 which is in a released position. One reason for this result is that each linkage 42 or 50 has a lost motion connection therein, and the respective rod 34 or 44 has a lost motion connection with the respective pressure plate 18 and 20 which latter lost motions are operable upon the respective clutch engagement by allowing the pressure plate to be biased relative thereto.

From the foregoing it is apparent that a dual clutch actuating mechanism has been described wherein "lash" does not effect the engaging characteristics of the clutches; wherein the manufacturing and wear tolerances do not subtract from the clutch engaging force; wherein independent control of two clutches located in a single housing by means of a common throw-out member is obtained; wherein a clutch structure which materially reduces the longitudinal length of the clutch housing by utilizing common biasing springs is obtained; wherein the load on the throw-out member is relieved when either clutch is engaged; wherein the actuating means has a locking mechanism which will lock either one or the other of the pressure plates in a disengaged position so that the opposite clutch disk can be engaged.

The preferred embodiment of this invention has been shown and described, but changes and modifications can be made, and it is understood that this description is illustrative only and not for the purpose of rendering this invention limited to the details illustrated or described except insofar as they have been limited by the terms of the following claims.

What is claimed is:
1. A dual clutch comprising in combination,
  (a) a driving member having a first and a second spaced apart engaging face disposed in opposed relationship,
  (b) a first and a second driven member disposed in spaced apart relationship between said engaging faces and each being adapted to engage one of the same,
  (c) a first and a second pressure member positioned between said driven members and drivingly connected to said driving member,
  (d) said first pressure member being adapted to press said first driven member into engagement with said first engaging face,
  (e) said second pressure member being adapted to press said second driven member into engagement with said second engaging face,
  (f) common spring means disposed between said pressure members for moving said members into engagement with their respective driven member and,
  (g) linkage means operatively connected to said pressure members for maintaining both said pressure members in a position where the same do not press on their respective driven member and for maintaining either one of said pressure members as a stationary reaction means in a position where the same does not press on a driven member and allowing the other pressure member to be moved by said spring means into engagement with its respective driven member and the latter is moved into engagement with said driving member.
2. In a clutch device the combination comprising,
  (a) a drive member having a first and a second driving portion,
  (b) a first and a second driven member,
  (c) a first and a second pressure member operatively associated with said first drive portion and first driven member and said second drive portion and second driven member respectively and each having a disengaged position and an engaged position,
  (d) resilient means disposed between said first and second pressure members,
  (e) operating means,
  (f) a pair of linkage means operatively connected to said operating means and each including a first lost motion connection,
  (g) each of said linkage means being operatively connected to one of said pressure members with each of said last operative connections including a second lost motion connection,
  (h) said operating means in a first position being operable through said linkage means to hold said pressure members in their disengaged position whereby said resilient means is maintained in an energy contained position,
  (i) and in a second position being operable through said linkage means to release said first pressure member so that said resilient means effects movement of the same to its engaged position through operation of said second lost motion connection connected thereto while maintaining said second pressure member stationary in a disengaged position through operation of the first lost motion connection in the linkage means connected thereto, and
  (j) in a third position being operable through said linkage means and the first lost motion connection therein to maintain said first pressure member in its disengaged position and release said second pressure member through the operation of said second lost motion connection connected thereto allowing the second pressure member to be biased by said resilient means to its engaged position.
3. In a clutch device the combination comprising,
  (a) a drive member having a first and a second driving portion,
  (b) a first and a second driven member,
  (c) a first and a second pressure member operatively associated with said first drive portion and first driven member and said second drive portion and second driven member respectively and each having a disengaged position and an engaged position,
  (d) resilient means disposed between said first and second pressure members,
  (e) operating means,
  (f) a first and a second connecting means connecting said operating means to said first and second pressure members respectively and each having a locked and an unlocked position and maintaining said pressure members in said disengaged positions when in their locked position,
  (g) said operating means having a central position wherein both said connecting means are locked and said pressure members are in their disengaged positions and being movable to one position maintaining said first connecting means locked and unlocking said second connecting means thereby releasing said second pressure member so that said resilient means effects movement of the same to its engaged position while maintaining said first pressure member in its disengaged position, and
  (h) being movable to another position to lock said second connecting means and unlock said first connecting means thereby releasing said first pressure member so that said reslient means effects movement of the same to its engaged position while maintaining said second pressure member in the disengaged position.
4. In a clutch device the combination comprising,
  (a) a drive member having a first and a second driving portion,
  (b) a first and a second driven member,
  (c) a first and a second pressure member operatively associated with said first drive portion and first driven member and said second drive portion and second driven member respectively and each having a disengaged position and an engaged position,
  (d) resilient means disposed between said first and second pressure members,
  (e) operating means,
  (f) a pair of linkage means each operatively connected to said operating means and one of said pressure members and each including locking means hav- ing a locked and an unlocked position and being operative when locked to maintain said pressure member in its disengaged position and when unlocked to allow said pressure member to move to its engaged position, (g) said operating means in a first position being operable to lock said pair of linkage means to hold said pressure members in their disengaged position whereby said resilient means is maintained in an energy contained position, (h) and in a second position being operable to unlock said first linkage means to release said first pressure member so that said resilient means effects movement of the same to its engaged position while maintaining said second linkage means locked to retain said second pressure member in its disengaged position, and (i) in a third position being operable to maintain said first linkage means in its locked position thereby maintaining said first pressure member in its disengaged position and to unlock said second linkage means thereby allowing said second pressure member to be biased by said resilient means to its engaged position.

5. A dual clutch comprising in combination,
(a) a driving member having a first and a second spaced-apart engaging face disposed in opposed relationship,
(b) a first and a second pressure member drivingly connected to said driving member and each having a disengaged position and an engaged position,
(c) said first pressure member being disposed in spaced relationship relative to said first engaging face,
(d) said second pressure member being disposed in spaced relationship relative to said second engaging face,
(e) a first driven member being disposed between said first pressure member and said first engaging face and adapted to be pressed into engagement with said first engaging face,
(f) a second driven member disposed between said second pressure member and said second engaging face and being adapted to be pressed into engagement with said second engaging face,
(g) common resilient means adapted to bias both of said pressure members to their respective engaged position,
(h) operating means,
(i) a pair of separate connecting means each operatively connecting said operating means to one of said pressure members and each including a locking means and a first and a second lost motion means,
(j) said locking and lost motion means being arranged so that when said first connecting means is in a locked position said lost motion means thereof is inoperative and said second connecting means is in an unlocked position and said lost motion means thereof is operative whereby said first connecting means retains said first pressure member in its intermediate position and said second connecting means allows said resilient means to bias said second pressure member to its engaged position, and
(k) when said second connecting means is in a locked position and said lost motion means thereof is inoperative and said first connecting means is in an unlocked position and said lost motion means thereof is operative whereby said second pressure member is retained in its disengaged position and said resilient means is allowed to bias said first pressure member to its engaged position.

6. A dual clutch comprising,
(a) a driving device,
(b) a first and a second pressure element driven by said driving device and each having a locked and an alternate position relative to said device,
(c) a first and a second linkage means connected to said first and second pressure elements respectively with said respective connections to said elements each including a lost motion means,
(d) a single operating means operatively connected to said linkage means and adapted to operate the same,
(e) each of said linkage means having an actuating mechanism including,
(f) a transfer member connected to one of said pressure elements and being movably mounted on said driving device,
(g) locking means carried by said driving device and being stationary relative to said transfer member,
(h) an actuating member movably carried by said driving device and operatively connected to said operating means,
(i) movable means operatively connecting said members and being adapted to lock said transfer member to said locking means.
(j) and lost motion means incorporated in said actuating member,
(k) said members and said locking means being arranged whereby in one position of said actuating mechanism said transfer member of said first actuating mechanism is locked to said first locking means by said first movable means and said first lost motion means permits said first actuating member to move relative to said first transfer member and said transfer member of said second actuating mechanism is operatively connected to said second actuating member and is moved by the same, and
(l) in a second position of said actuating mechanism said transfer lever of said second actuating mechanism being locked to said second locking means by said second movable means and said second lost motion means permits said second actuating member to move relative to said second transfer member, and said transfer member of said first actuating mechanism being operatively connected to said first actuating member and being operable to be moved by the same,
(m) whereby said linkage means are adapted in one position of said operating means to lock said first pressure element and allow said second pressure element to move and in another position of said operating means to lock said second pressure element and allow said first pressure element to move.

7. A dual clutch comprising in combination,
(a) a driving device having a first and a second spaced apart engaging face disposed in opposed relationship,
(b) a first and a second pressure element drivingly connected to said driving device and being disposed in spaced relationship relative to said first and second engaging faces respectively,
(c) a first driven device being disposed in spaced relationship between said first pressure element and said first engaging face and adapted to be pressed into engagement with said first engaging face by said first pressure element,
(d) a second driven device disposed between said second pressure element and said second engaging face and being adapted to be pressed into engagement with said second engaging face by said second pressure element,
(e) common resilient means caged between said pressure elements and adapted to bias the same into engagement with said driven devices,
(f) a first and a second linkage means operatively connected to said first and second pressure elements respectively with each of said operative connections including a first lost motion means,
(g) a single operating means operatively connected to each of said linkage means and adapted to operate the same, (h) each of said linkage means having an actuating mechanism including, (i) a transfer member operatively connected to one of said elements and being movably mounted on said driving device, (j) locking means carried by said driving device and being stationary relative to said transfer member, (k) an actuating lever member operatively connected to said operating means and movably carried by said driving device, (l) movable means operatively connecting said members and being adapted to lock said transfer member to said locking means, and (m) second lost motion means incorporated in said actuating lever member, (n) said members and said locking means being arranged whereby in one position of said operating means said transfer member of said first actuating mechanism is locked to said first locking means by said first movable means and said first lost motion means permits said first actuating member to move relative to said first transfer member and said transfer member of said second actuating mechanism is operatively connected to said second actuating member and is operable to move by the same, (o) and in a second position of said actuating mechanism said transfer lever of said second actuating mechanism being locked to said second locking means by said second movable means and said second lost motion means permits said second actuating member to move relative to said second transfer member and said transfer member of said first actuating mechanism being operatively connected to said first actuating member and being operable to be moved by the same, (p) whereby said linkage means are adapted in one position of said operating means to lock said first pressure element in spaced relationship relative to said first driven device and allow said second pressure element to be biased by said common resilient means into engagement with said second driven device and in another position of said operating means to lock said second pressure element in spaced relationship relative to said second driven device and allow said first pressure element to be biased by said common resilient means into engagement with said first driven device.

8. An operating mechanism for a device including an element having a locked and an alternate position comprising, (a) linkage means connected to said element, (b) linkage operating means operatively connected to said linkage means and adapted to operate the same, (c) said linkage means including, (d) a movable transfer member connected to said element, (e) a locking means carried by said device, (f) an actuating member operatively connected to said linkage operating means and being movably mounted on said device, (g) movable means operatively connecting said transfer member and said actuating member and adapted to connect said transfer member to said locking means, (h) lost motion means carried by said actuating member, (i) said members and said locking means being arranged whereby in one position of said actuating member said transfer member is locked to said locking means by said movable means and said lost motion means permits said actuating member to move relative to said transfer member, and in a second position of said actuating member the actuating member is connected to said transfer member by said movable means and said lost motion means is inoperative whereby said actuating member is adapted in one position to lock the element and in another position to allow the element to move to its alternate position.

9. An operating mechanism for a device including an element having a locked and an alternate position comprising in combination, (a) linkage means connected to said element, (b) operating means operatively connected to said linkage means and being adapted to be moved to alternate positions, (c) said linkage means including, (d) pivot means, (e) a transfer member pivotally connected by said pivot means to said device and operatively connected to said element and having receiving means therein, (f) arcuately elongated first cam means carried by said device with the arc center thereof defined by the center of said pivot means, (g) first detent means provided in said first cam means and disposed adjacent one operative end thereof, (h) an actuating member pivotally connected to said device by said pivot means and being operatively connected to said operating means, (i) an arcuately elongated second cam means carried by said actuating member with the arc center thereof defined by the center of said pivot means, (j) said first and second cam means being disposed in cooperative relationship, (k) abutment means carried by said second cam means at one operative end thereof, (l) second detent means provided in said second cam means adjacent to said abutment means, and (m) cam follower means adapted to engage both said cam means and be received in said receiving means of said transfer member, (n) said cam follower means being cammed alternately by said first and second cam means, and (o) relative movement between said actuating member and said device in alternate directions camming said cam follower means into said first and second detent means alternately, (p) whereby when said cam follower means is cammed into said first detent means said transfer member is operatively connected to said device in a locked relationship and said actuating member may move relative thereto and when said cam follower means is cammed into said second detent means said transfer member is operatively connected to said actuating member and said members move unitarily relative to said device carrying said element therewith.

10. A dual clutch comprising in combination, (a) a flywheel including a first driving face, (b) a back plate drivingly attached to said flywheel and disposed in parallel spaced relationship relative thereto, (c) said back plate including a second driving face disposed in opposed relationship with respect to said first driving face, (d) a first and a second pressure plate drivingly connected to said flywheel and interposed between and spaced from said driving faces, (e) said pressure plates being disposed in back-to-back spaced relationship and being independently movable, (f) a first driven member disposed between said first pressure plate and said first engaging face and adapted to be pressed into engagement with said first engaging face by said first pressure plate, (g) a second driven member disposed between said second pressure plate and said second engaging face and adapted to be pressed into engagement with said second engaging face by said second pressure plate, (h) common resilient means caged between said pressure plates and adapted to bias the same into engagement with said driven members,
(i) a single throw-out collar adapted to actuate both pressure plates,
(j) a first and a second linkage means being operatively connected to said throw-out collar and adapted to be operated simultaneously thereby,
(k) a pull rod means operatively connected to said first pressure plate and adapted to engage and pull the same against the bias of said resilient means and being further adapted to be moved from engagement with said pressure plate thereby allowing said resilient means to bias the same,
(l) a push rod means operatively connected to said second pressure plate and adapted to engage and push the same against the bias of said resilient means and being further adapted to be moved from engagement with said second pressure plate thereby allowing said resilient means to bias the same,
(m) said first linkage means being adjustably connected to said pull rod means and adapted to alternately move the same into pulling engagement with and disengagement from said first pressure plate,
(n) said second linkage means being adjustably connected to said push rod means and adapted to alternately move the same into pushing engagement with and disengagement from said second pressure plate,
(o) said first linkage means including,
 (1) a movable transfer member operatively connected to said pull rods,
 (2) a locking means carried by said backing plate,
 (3) an actuating member operatively connected to said throw-out collar and being movably mounted on said backing plate,
 (4) movable follower means operatively connecting said transfer member and said actuating member and adapted to connect said transfer member to said locking means,
 (5) a lost motion means carried by said actuating member,
 (6) said actuating member, said locking means, and said transfer member being arranged so that in one position of the actuating member said transfer member is locked to said locking means by said movable follower means and said lost motion means permits said actuating member to move relative to said transfer member,
 (7) and in a second position of said actuating member the actuating member is connected to said transfer member by said movable follower means and said lost motion means is inoperative whereby said actuating member is adapted in one position to lock the first pressure plate against movement and in another position to permit said first pressure plate to move,
(p) said second linkage means including,
 (1) a movable transfer member operatively connected to said push rods,
 (2) a locking means carried by said backing plate,
 (3) an actuating member operatively connected to said throw-out collar and being movably mounted on said backing plate,
 (4) movable follower means operatively connecting said transfer member and said actuating member and being adapted to connect said transfer member to said locking means,
 (5) lost motion means carried by said actuating member,
 (6) said transfer member, said locking means, and said actuating means being arranged whereby in one position of said actuating member said transfer member is locked to said locking means by said movable follower means and said lost motion means permits said actuating member to move relative to said transfer member,
 (7) and in a second position of said actuating member the actuating member is connected to said transfer member by said movable follower means and said lost motion means is inoperative whereby said actuating member is adapted in one position to lock the second pressure plate against movement and in another position to allow said second pressure plate to move,
(q) said transfer and actuating members and said locking means of said first linkage being disposed with respect to said transfer and actuating members and locking means of said second linkage so that in one position of said throw-out collar said transfer member of said first linkage means is locked to said first locking means by said first movable follower means and said first lost motion means permits said said first actuating member to move relative to said first transfer member and said transfer member of said second actuating mechanism is operatively connected to said second actuating member and operable to be moved thereby, and
(r) in a second position of said throw-out collar said transfer lever of said second linkage means is locked to said second locking means by said second movable follower means and said second lost motion means permits said second actuating member to move relative to said second transfer member and said transfer member of said first actuating mechanism being operatively connected to said first actuating member and being operable to be moved thereby,
(s) whereby said first and second linkage means are operable in one position of said throw-out collar to lock said first pressure place in spaced relationship relative to said first driven member and allow said second pressure plate to be biased by said common spring means into engagement with said second driven member and in another position of said throw-out collar to lock said second pressure plate in spaced relationship relative to said second driven member and allow said first pressure plate to be biased by said common resilient means into engagement with said first driven member.

References Cited by the Examiner
UNITED STATES PATENTS

| 892,175 | 6/08 | Miller. |
|---|---|---|
| 1,875,696 | 9/32 | Beringer. |
| 2,195,783 | 4/40 | Ravigneaux. |
| 2,261,432 | 11/41 | Cooke. |
| 2,366,594 | 1/45 | Carlson. |
| 2,379,023 | 6/45 | Miller. |

DAVID J. WILLIAMOWSKY, Primary Examiner.
ROBERT C. RIORDON, Examiner.